Oct. 15, 1940.   D. N. DEERING   2,218,280
BAIT
Filed May 4, 1940
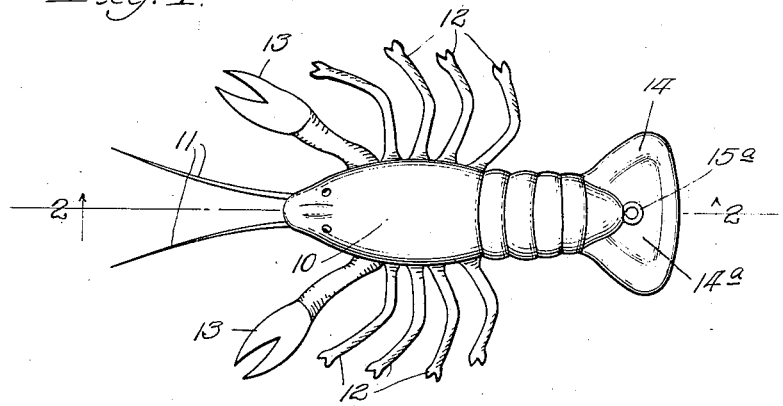
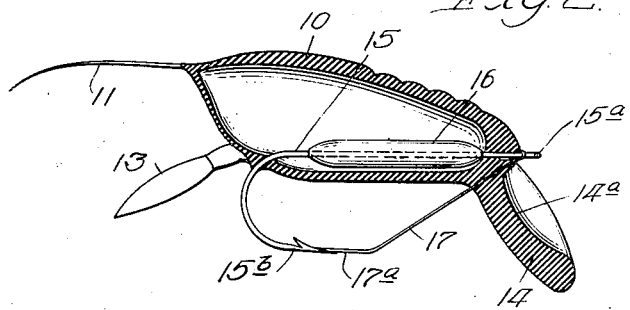
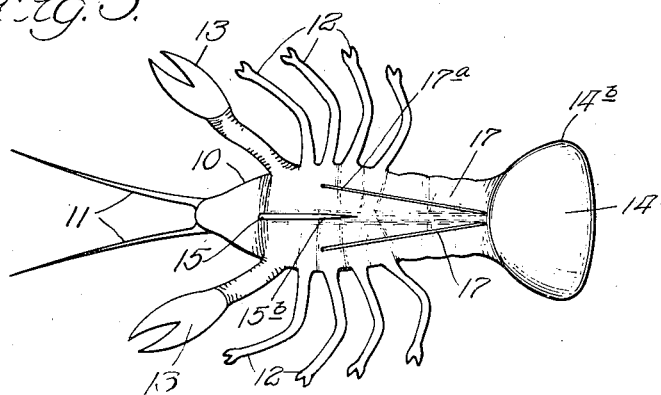
Inventor:
David N. Deering, Patented Oct. 15, 1940

2,218,280

UNITED STATES PATENT OFFICE 2,218,280

BAIT

David N. Deering, Antioch, Ill.

Application May 4, 1940, Serial No. 333,419

2 Claims. (Cl. 43—42)

This invention relates to improvements in bait and more especially an artificial bait used as a lure adapted for angling, trolling and the like.

Among the features of my invention is the provision of a bait made of live tough rubber, lifelike in appearance, closely resembling a softshell crab.

My improved bait may be made in various sizes but I have found that if the same is made about three inches long and weight from ½ to ⅝ of an ounce it makes an attractive lure for bass and other game fish.

Another feature of my invention is the making of a bait that is well balanced and provided with a waterproof hook well guarded with a newly designed weed guard. My improved bait can be fished in water that cannot be worked with ordinary lures.

Another feature of my invention is the provision of a concave, cup-shaped tail which causes the device to dart from side to side and downwardly as it is drawn tail first through the water to make the bait appear lifelike. The concave cup-shaped tail also causes the bait to descend very deeply at times as it is towed and thus reach fish such as small-mouthed bass which are frequently found in deep water.

Another feature of my invention is the making of the bait of soft rubber and hollow in order to give it the necessary buoyancy.

Other features and advantages of my invention will appear more fully as I proceed with my specification.

In that form of device embodying the features of my invention shown in the accompanying drawing, Fig. 1 is a top plan view, Fig. 2 is a view taken as indicated by the line 2 of Fig. 1, and Fig. 3 is a bottom plan view.

As shown in the drawing, the device is made of soft flexible rubber, the body being indicated in general by 10. Suitable coloring is also provided. For example, the upper surface may be tinted a muddy green and the under side may be a pale yellow or grey. 11, 11 indicate flexible rubber antennae or feelers, 12, 12 similar legs and 13, 13 similar claws.

14 indicates a tail which is somewhat thicker and stiffer than the legs so that it has a slight flexibility under pressure but ordinarily will retain substantially the position shown in the drawing. It is to be noted that the tail slants downwardly and backwardly at substantially an angle of 45° from the animal. Since the bait is drawn backwardly through the water, however, the rear end of the animal hereafter will be referred to as the forward end of the bait. In other words, the forward end will ordinarily be referred to as the end that goes first as the bait is drawn through the water as that is the most important thing. Consequently, in the claims, the tail will be referred to as extending downwardly and forwardly at substantially an angle of 45°. The tail is also widened and somewhat fan-shaped as shown in Fig. 1 and is also hollowed out or concave on the upper surface as indicated by 14a.

Embedded in the body of the bait is a hook 15 which is suitably plated to make the same waterproof. The eye 15a of this hook protrudes from the body at the forward end (the tail of the body) and the hook portion as indicated by 15b lies below the body. The shank of the hook lies inside of the hollow body 10 and has thereon a weight 16 sufficient to prevent the bait from having too much buoyancy.

The line is adapted for attachment to the eye 15a so that when the bait is drawn through the water the tail 14 will cause the same to dart from side to side and also downwardly, carrying the bait at times to considerable depth.

The hook is also provided with a weed guard comprising two flexible wires 17, 17 attached to the shank of the hook near the eye 15a and extending downwardly and somewhat to the sides so that the lower ends 17a of the guard wires 17 lie, one to each side of the point of the hook. It will be seen that the lower end of the tail 14 is slightly below the lower ends of the weed guards 17 and that the tail extends downwardly and forwardly at an angle of about 45° whereas the weed guards 17 extend downwardly and backwardly at an angle of about 45°. It will also be seen that the sides 14b of the tail are slightly farther apart than the lower ends 17a of the weed guard wires. The combination of the tail and the wires 17 cooperates to prevent fouling of the hook by weeds.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A device of the character described, including, a soft flexible hollow body adapted to be drawn tail first through the water, said body having at its forward end a downwardly and forwardly projecting tail concave on its upper surface.

2. A device of the character described, including: a flexible hollow body adapted to be drawn tail first through the water, said body having at its forward end a downwardly and forwardly projecting tail; and a hook having its shank embedded in said body and its hook portion lying below said body and back of said tail.

DAVID N. DEERING.